US008825579B1

(12) United States Patent		(10) Patent No.: 	US 8,825,579 B1
Miller		(45) Date of Patent: 	Sep. 2, 2014

(54) SIGNAL PREDICTION FROM SAMPLING ON GEOMETRIC SEQUENCES

(71) Applicant: Patrick Arthur Miller, Brooklyn, NY (US)

(72) Inventor: Patrick Arthur Miller, Brooklyn, NY (US)

( * ) Notice: Subject to any disclaimer, the term of this patent is extended or adjusted under 35 U.S.C. 154(b) by 0 days.

(21) Appl. No.: 13/792,010

(22) Filed: Mar. 9, 2013

(51) Int. Cl.
G06N 5/02 (2006.01)

(52) U.S. Cl.
CPC .......................................... G06N 5/02 (2013.01)
USPC ............................................................ 706/46

(58) Field of Classification Search
None
See application file for complete search history.

(56) References Cited

U.S. PATENT DOCUMENTS 4,398,274 A * 8/1983 Chotiros ......................... 367/90

OTHER PUBLICATIONS

Farmer, J. Doyne et al.; "Predicting Chaotic Time Series"; 1987; The American Physical Society; Physical Review Letters, vol. 59, No. 8; pp. 845-848.*

* cited by examiner

*Primary Examiner* — Stanley K Hill

(57) ABSTRACT

A method and system are described that can predict the future value of a positive signal from prior measured values of the signal. The signal is measured at a prior baseline time, and at times incrementally beyond the baseline time. The post-baseline time increments comprise sets of geometric sequences. The system produces a future estimate of the signal merely by multiplying and dividing prior signal values. By repeated operation, the system can produce an output signal: a continuing stream of periodic signal predictions, which approximates periodic samples of the future signal "pulled back" in time.

12 Claims, 5 Drawing Sheets

SIGNAL PREDICTION FROM SAMPLING ON GEOMETRIC SEQUENCES

BACKGROUND OF THE INVENTION

Human beings have long been interested in predictions of what the future will be. In recent centuries, mathematicians have succeeded in finding methods of prediction for a very limited range of phenomena. If the predicted entity is a measurable quantity, it is possible to estimate the magnitude of the quantity at a future time, given its magnitude at previous times, if the measured quantity changes smoothly, i.e., has no sudden changes. A mathematician would call such a smoothly varying quantity an "analytic" function of the time.

Brook Taylor, an English mathematician, was among the first to invent such a method, nearly three centuries ago, in 1715. Taylor's formula calculates the value of a smoothly-varying quantity $f$ at a future time t from knowledge of the quantity at a previous time $t_0$. The formula uses the value of the quantity at time $t_0$ and its derivatives at $t_0$. The need to know the derivatives of the quantity limits the formula's usefulness. Sometimes it is possible to calculate the analytic form of these derivatives, but this requires knowledge of the analytic form of the quantity itself. In many situations, one does not have this information.

There are many other methods for estimating the value of a quantity at a future time from its values at previous times. Some other methods rely on adjusting parameters (i.e., constants) of an analytic expression, which is assumed to accurately characterize the quantity. Such methods include mean-square curve-fitting and the maximum likelihood method, which are described in many textbooks. The parameters to be adjusted might include slope and intercept (in the case of a line), or standard error and central value (in the case of a probability distribution). However, these methods, like Taylor series, assume that one knows the analytic form of the quantity (e.g., a line or bell-shaped curve). They are not useful if the analytic form of the quantity is not known.

Recently researchers have learned to use neural networks to predict future signal values. The neural network is "trained" on previous data. Neural networks can sometimes produce reasonable results for non-smooth signals, such as a sawtooth signal. As applied, however, neural networks are often trained to recognize expected patterns in the signal, such as frequency components or wavelet patterns.

SUMMARY OF THE INVENTION

The present invention is a system and method that can predict an estimate of the future value of a smooth signal from prior values, without any knowledge of the form of the signal. The system measures signal values at a baseline time and at a collection of succeeding times. The baseline time is the time at which the first measurement of the signal is made. The time increments—from the baseline time to each of the succeeding measurement times—form sets of geometric sequences. Although the method requires a large number of signal measurements, the processing that produces the prediction is quite simple. The method calculates the predicted signal value merely by multiplying and dividing the prior measured signal values. By repetition, the method is capable of producing an output signal: a continuing stream of signal predictions, which approximates periodic samples of the future signal "pulled back" in time.

DESCRIPTION OF THE DRAWING

The present invention will hereafter be described with reference to the accompanying drawings, of which.

DESCRIPTION OF THE INVENTION

The invention is a system and method that predicts an estimate of a future value of a signal from prior measured values of the signal. The times when the signal is measured include a baseline time and a collection of incrementally subsequent times. The baseline time is the time at which the first measurement of the signal is made. The time increments—from the baseline time to each of the succeeding measurement times—form sets of geometric sequences. The predicted future value of the signal is obtained merely by multiplying and dividing the prior measured signal values.

The mathematical basis for the method is a theorem in mathematical analysis that was discovered by the inventor. The method applies only to signals that are not negative. However, a bounded signal that takes on negative values can be adapted for the method, by adding to the signal a sufficiently-large positive bias.

System Architecture

Figure 1:
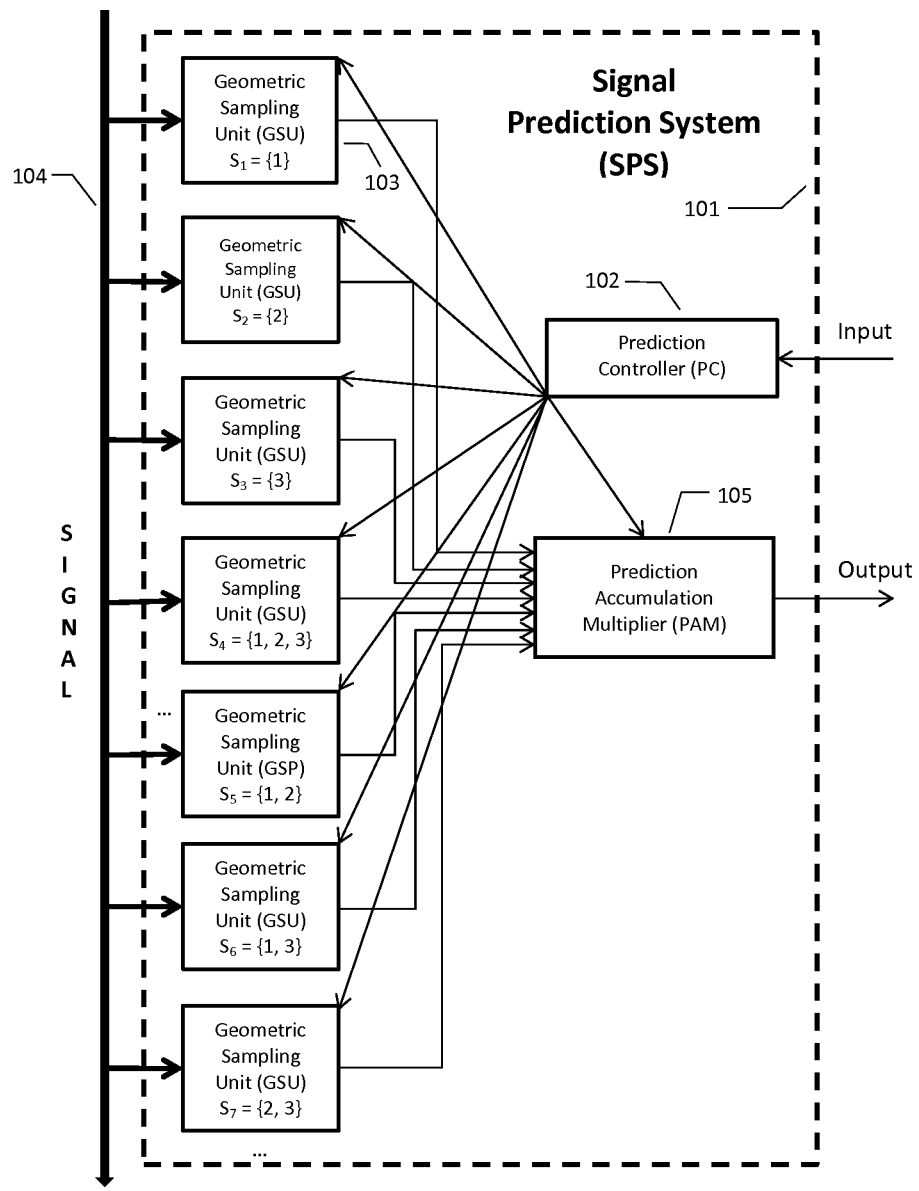
FIG. 1 is a block diagram of one embodiment of a Signal Prediction System, which is comprised of a Prediction Controller (PC), multiple Geometric Sampling Units (GSUs) and a Prediction Accumulation Multiplier (PAM)

One example embodiment of the system, which we call the Signal Prediction System (SPS) is shown in FIG. 1. The architecture of the SPS closely parallels the structure of the method. The SPS 101 comprises a Prediction Controller (PC) 102, multiple Geometric Sampling Units (GSUs), e.g. 103, and a Prediction Accumulation Multiplier (PAM) 105.

The PC accepts user input parameters, and distributes to the PAM and to each of a number of GSUs, the parameters they require for the prediction. The system comprises at least one GSU for each geometric sequence of measurement times used by the method. The basic functions of a GSU are to measure the signal values at the baseline time and the subsequent times for one geometric sequence, normalize each value, raise each normalized value to an appropriate power, and report the result or its inverse to the PAM. Each GSU has access to the signal 104 whose future value is to be predicted, and has means to measure the magnitude of the signal. The PAM multiplies the values received from the GSUs, keeping track of when the GSUs have all indicated that they have finished reporting the results of their measurements. When this occurs, the PAM outputs its product, which is the predicted future value of the signal. The process may then be repeated, if the user desires a continuing stream of periodic signal predictions. The number of geometric sequences to be used, the measurement times appropriate to each geometric sequence, and the appropriate exponent to be used in calculating the result of each measurement, are described below.

Process of the Prediction Controller

Figure 2:
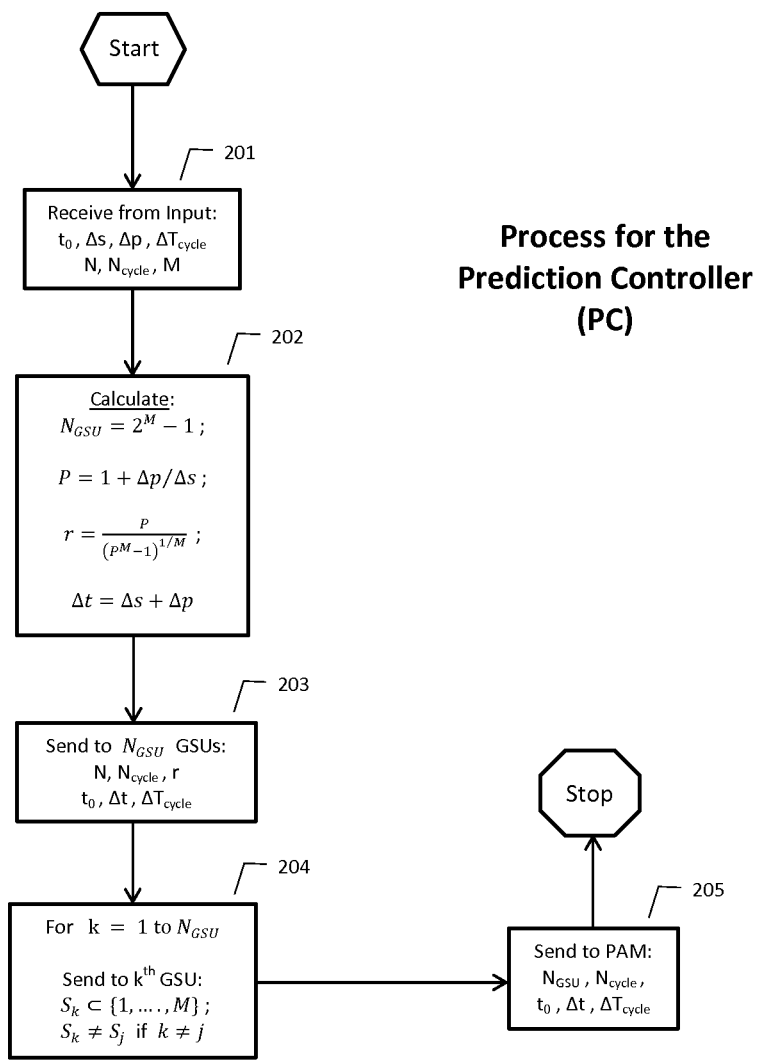
FIG. 2 is a description of the method followed by the Prediction Controller.

FIG. 2 is a flowchart of the method followed by the Prediction Controller. The method uses several parameters input by the user of the SPS, and other parameters calculated therefrom by the PC that are used by the GSUs and the PAM.

In step 201, the PC collects parameters input by the user of the SPS. They include the following:

M is a positive integer that determines the number of geometric sequences of time increments used in the prediction. The number of geometric sequences used by the method is $2^M-1$. Since there is one GSU for each geometric sequence, the SPS must contain at least $2^M-1$ GSUs to make the prediction. M is an optional user input. If the user does not provide a value, the PC uses a default value, equal to $\log_2(N_{GSU}+1)$, where $N_{GSU}$ is the largest integer equal to one less than a power of two, and is also less than or equal to the number of GSUs in the system.

N is a positive integer that determines the number of time increments in each of the geometric sequences.

$N_{cycle}$ is the number of consecutive signal predictions requested by the user. A negative value for $N_{cycle}$ is interpreted by the SPS as a request for an unending stream of successive periodic signal predictions.

$t_0$ is the baseline time of the first signal measurement used in the prediction.

$\Delta s$, the sampling interval, is the length of time during which the signal will be sampled for one prediction. The last signal measurement during one cycle is made at time $t_0+\Delta s$.

$\Delta p$, the prediction interval, is the length of time between when the last signal measurement is made and the future time for which the value of the signal is being predicted.

$\Delta T_{cycle}$ is the time requested between successive periodic signal predictions.

From the user input, the PC in step 202 calculates:

$N_{GSU}=2^M-1$, the number of GSUs to be used for the requested prediction;

$P=1+\Delta p/\Delta s$, a measure of the power or range of the prediction, used solely to calculate the geometric ratio r;

$r=P/(P^M-1)^{1/M}$, the common geometric ratio of all the geometric sequences used in the prediction; and $\Delta t=\Delta s+\Delta p$, the time between the baseline time $t_0$ and the time for which the future value of the signal is being predicted.

In step 203 the PC sends to each of the $N_{GSU}$ GSUs participating in the prediction the following parameters: N, $N_{cycle}$, r, $t_0$, $\Delta t$, and $\Delta T_{cycle}$.

In step 204 the PC generates all of the non-empty subsets of the first M positive integers, including the so-called improper subset containing all M integers; the PC assigns a unique subset to each of $N_{GSU}$ GSUs; and the PC sends that subset to its GSU. For the $k^{th}$ GSU, this subset, called its generating set, will be referred to as $S_k$. The post-baseline geometric sequence of times when the GSU measures the signal depends upon its generating set. FIG. 1 illustrates the case of M=3, in which 7 GSUs are required; each GSU is labeled with its generating set of integers.

Finally, the PC sends to the PAM the parameters it requires: $N_{GSU}$, $N_{cycle}$, $t_0$, $\Delta t$, and $\Delta T_{cycle}$.

Process of the Geometric Sampling Unit

Figure 3:
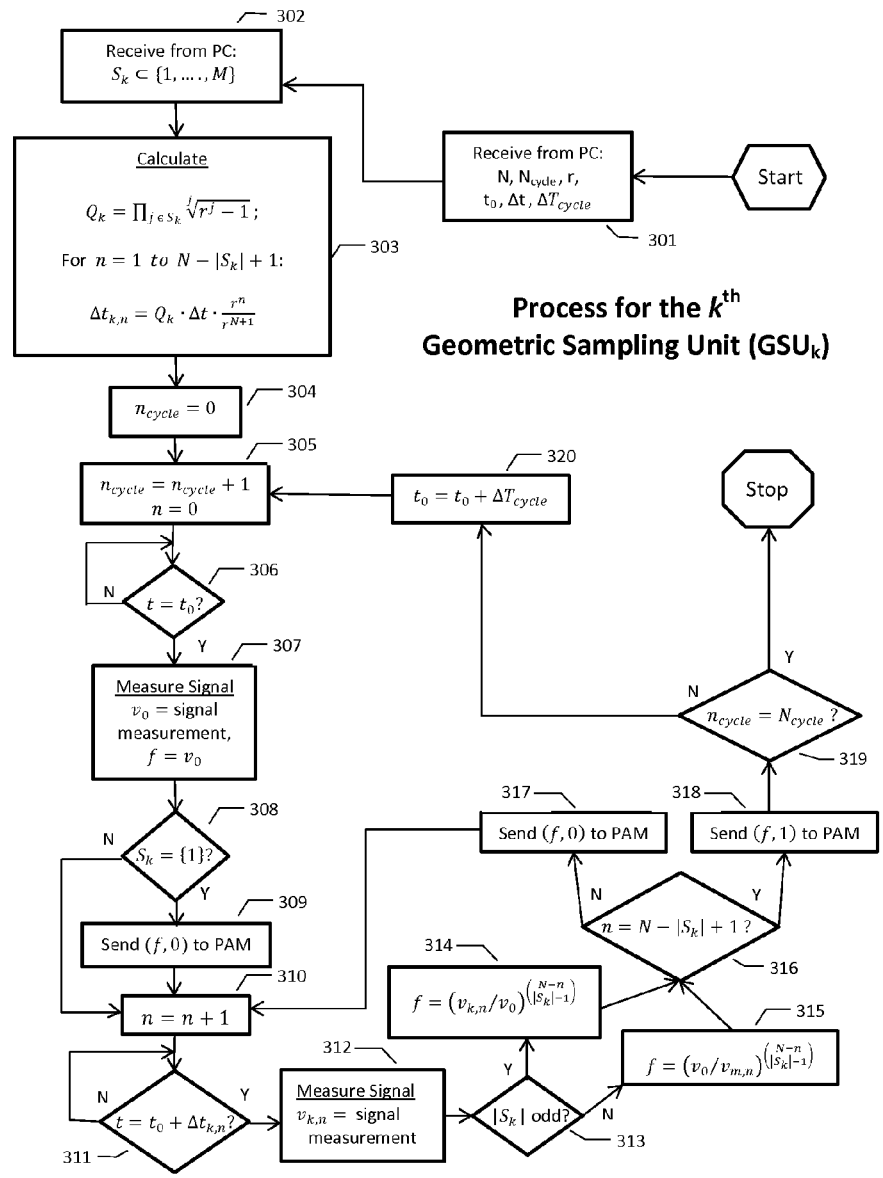
FIG. 3 is a description of the method followed by each Geometric Sampling Unit.

FIG. 3 is a flowchart of the method followed by the $k^{th}$ Geometric Sampling Unit.

In step 301 the GSU receives the parameters sent to it by the PC. In step 302 the GSU receives $S_k$, the unique generating set of integers assigned by the PC to the $k^{th}$ GSU.

In step 303, the GSU calculates the geometric sequence of time increments $\Delta t_{k,n}$ that will be added to $t_0$ to form its set of measurement times beyond $t_0$. The time increments are given by $\Delta t_{k,n}=Q_k\cdot\Delta t\cdot r^n/r^{N+1}$, where $Q=\Pi_{j\in s_k}(r^j-1)^{1/j}$, $|S_k|$ is the number of integers in the set $S_k$, and the index n runs from 1 to $N-|S_k|+1$.

The GSU keeps a count of two things: $n_{cycle}$ counts how many cycles of measurements have been started, and n counts the number of the time increments used so far by a GSU in each measurement cycle. A cycle is the process for making all of the measurements, and doing all of the calculations, required for a single signal prediction. In step 304, the GSU initializes $n_{cycle}$. In step 305, the GSU increments $n_{cycle}$ and initializes n.

In step 306, the GSU waits for the current time t to equal time the $t_0$, whereupon in step 307 it measures the magnitude of the signal $v_0$ at the time $t_0$.

Most of the signal measurements are normalized, by dividing them by $v_0$. But the predicted signal value requires one unnormalized factor of $v_0$ in its numerator. This is accomplished by each GSU in step 308 testing whether its generating set is equal to $\{1\}$. Only the unique GSU that passes this test sends the value $f=v_0$ to the PAM, along with a flag value of zero, in step 309. A flag value of zero indicates to the PAM that the GSU is not yet done sending all of its signal prediction factors for the current measurement cycle to the PAM.

In step 310 the GSU increments n, beginning the process of measuring the signal for the $n^{th}$ time increment beyond $t_0$. In step 311 the GSU waits until the current time t reaches $t_0+\Delta t_{k,n}$, the time associated with the $n^{th}$ time increment of the $k^{th}$ geometric sequence; at that time it measures the magnitude of the signal $v_{k,n}$ in step 312. In step 313 the GSU tests whether the number of integers in its generating set, $|S_k|$, is odd or even. If it is odd, in step 314 the GSU calculates the next prediction factor $f$ that it will send to the PAM, by calculating the normalized signal value, $v_{k,n}/v_0$, and raising it to the power given by the binomial coefficient $(_{|S_k|-1}^{N-n})$. If it is even, in step 315 the GSU calculates the next prediction factor $f$ that it will send to the PAM, by calculating the inverse of the normalized signal value, $v_0/v_{k,n}$, and raising it to the power given by the binomial coefficient $(_{|S_k|-1}^{N-n})$.

In step 316 the GSU compares n, the number of post-$t_0$ measurements that have been made, with the number of such measurements that are to be made in the current measurement cycle, $N-|S_k|+1$. If they are not equal, in step 317 the GSU sends the prediction factor $f$ to the PAM with a flag value of zero; it then loops back to step 310 to begin the next signal measurement of the cycle. If they are equal, in step 318 the GSU sends the prediction factor $f$ to the PAM with a flag value of one, and proceeds to step 319. A flag value of one indicates to the PAM that the GSU has finished reporting its prediction factors.

At step 319 the GSU checks whether the count of completed measurement cycles, $n_{cycle}$, equals the number to be done, $N_{cycle}$. If so, the GSU stops. If not, in step 320 the GSU increments $t_0$ by $\Delta T_{cycle}$, and loops back to step 305 to begin the next measurement cycle. Note that if the user inputs a negative value for $N_{cycle}$, the GSU will always loop back to step 305, and the GSU will report a continuing stream of signal prediction factors to the PAM.

Process of the Prediction Accumulation Multiplier

Figure 4:
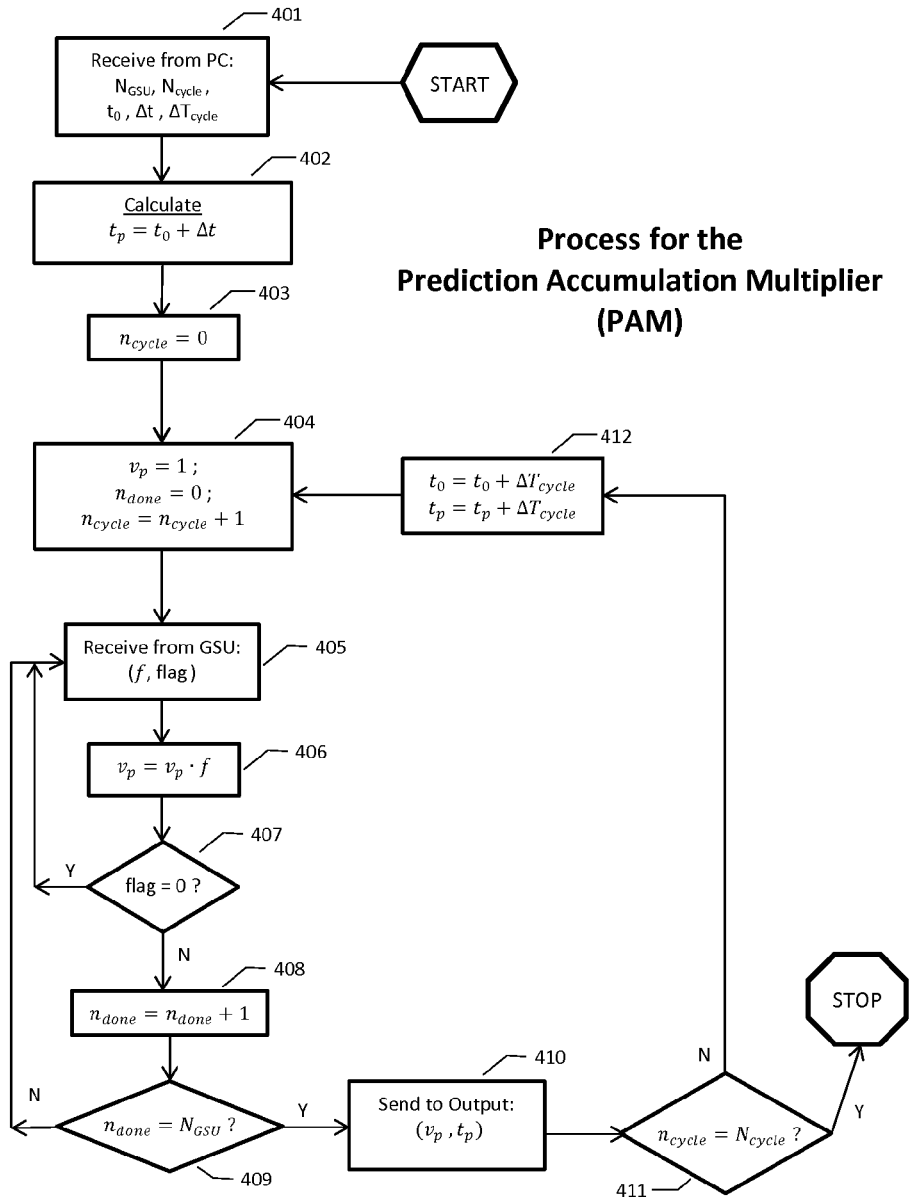
FIG. 4 is a description of the method followed by the Prediction Accumulation Multiplier.

FIG. 4 is a flowchart of the method followed by the Prediction Accumulation Multiplier.

The process of the PAM begins in step 401 when it receives from the PC the parameters $N_{GSU}$, $N_{cycle}$, $t_0$, $\Delta t$, and $\Delta T_{cycle}$. In step 402 the PAM calculates $t_p=t_0+\Delta t$, the future time for which the prediction of the signal is to be made. In step 403 the PAM initializes $n_{cycle}$ to zero, which it increments in step 404. In step 404 the PAM also initializes $n_{done}$ to zero; $n_{done}$ counts the number of GSUs that have finished reporting the results of their measurements to the PAM for the current cycle.

In step 404 the PAM also initializes the quantity $v_p$ to unity. The purpose of the PAM is to produce the predicted value of the signal $v_p$ at time $t_p$. The PAM incorporates all of the factors of the predicted signal value, which are sent to it by the GSUs, into the quantity $v_p$—including the single factor of $v_0$. The PAM does so by multiplying the current value of $v_p$ serially by each factor received; therefore, the value of $v_p$ is initialized to unity.

In step 405 the PAM receives two values, $f$ and a flag value, from a GSU. In step 406 the PAM multiplies the current value of $v_p$ by this factor, thereby incorporating this factor into the prediction. In step 407 the PAM checks whether this factor is the last to be received during this measurement cycle from the GSU that sent it. If the flag value is zero, it is not, and the PAM loops back to step 405 to receive the next factor sent by a GSU. If the flag value is one, this is the last factor to be received from this GSU in the current cycle; and the PAM proceeds to step 408, in which it increments $n_{done}$, the count of GSPs that are done with this cycle of measurements.

In step 409 the PAM compares the number of GSUs that are done with the number of GSUs participating in the prediction. If they are not equal, the PAM returns to step 405 to receive the next factor sent by a GSU that is not yet done. If all GSUs are finished reporting their measurement factors, in step 410 the PAM outputs two values: $v_p$, the predicted signal value, and the time $t_p$ for which $v_p$ is the predicted value.

In step 411 the PAM checks whether the number of cycles completed is equal to the number of cycles to be performed. If so, the PAM stops; if not, it increments both $t_0$ and $t_p$ by $\Delta T_{cycle}$ in step 412, before looping back to step 404 to begin the next cycle. If the user has input a negative value for $N_{cycle}$, the PAM always proceeds from step 411 to step 412, and will produce a continuing stream of periodic signal predictions and their times.

Example Output

Figure 5:
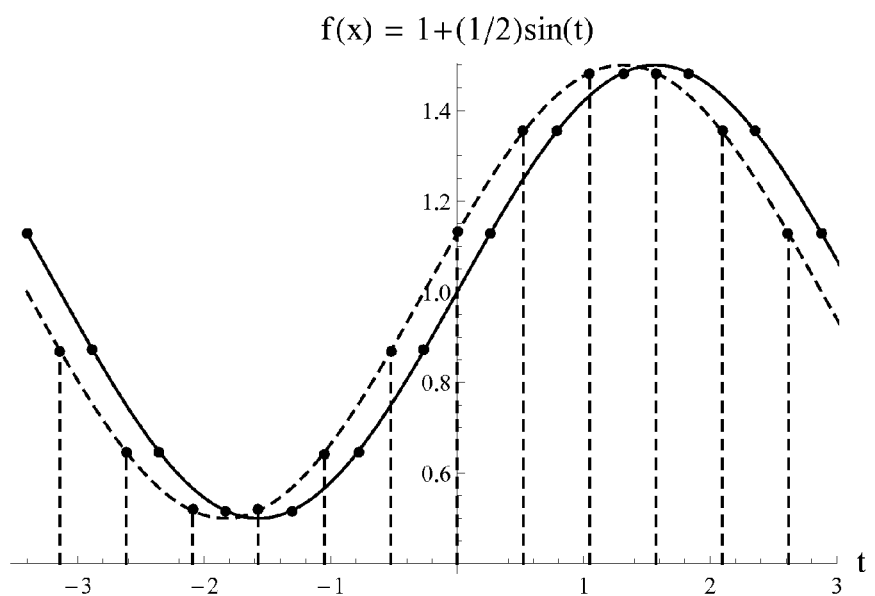
FIG. 5 is an example output of the method, calculating the future value of a sinusoidal function.

FIG. 5 is an example of the output of the method. The method was used to calculate the future value of an analytic function, namely $f(t)=1+(½)\sin(t)$. The solid line is the function $f$. The dashed line is the pullback of the function $f$, namely $f(t+p)$. The dots on the dashed line are predictions of future values of the function $f$, calculated using the method of the present invention. The dots on the solid line are values of the function itself. Observe that (1) the predicted values of the function do, in fact, lie on the pullback's dotted line, and (2) the value of the ordinate at these times is equal to the corresponding value of the function itself, a time interval p later. The prediction uses the values $M=4$, $\Delta s=\pi/6$, $\Delta p=\pi/12$, and $N=500$. The predictions have a time spacing equal to $\Delta s$, as they would have if the method were used on an actual signal to produce a stream of predictions, with sampling interval $\Delta s$. The calculations and graphs were produced using Mathematica.

Other embodiments of the invention will be apparent from the foregoing description to those of ordinary skill in the art, and such embodiments are likewise to be considered within the scope of the invention as set out in the appended claims.

What is claimed is:

1. A method for predicting the future value of a signal from prior measurements of the signal, said method comprising the steps of
    (a) measuring the signal at a baseline time and at a number of incrementally later times whose time increments beyond the baseline time comprise a number of geometric sequences; and
    (b) forming said prediction, which is a product solely composed of a number of factors, each of said factors being either one of said measured signal values or the inverse of one of said measured signal values.

2. The method according to claim 1 which further comprises the step of collecting a plurality of input parameters describing the prediction or predictions to be made, said input parameters comprising:
    (a) a baseline measurement time $t_0$;
    (b) a sampling interval $\Delta s$ equal to the length of the time interval between the baseline time and the time when the final signal measurement of a prediction is made;
    (c) a prediction interval $\Delta p$ equal to the length of the time interval between the time of the last signal measurement and the time for which the prediction of the signal is made;
    (d) a time interval $\Delta T_{cycle}$, being the time interval between successive periodic signal predictions;
    (e) an integer N that determines the number of measurement time increments within each of said geometric sequences;
    (f) a parameter $N_{cycle}$ determining the number of predictions to be made;
    (g) and optionally a positive integer M determining the number of said geometric sequences of times beyond the baseline time at which the signal will be measured;
and the step of using a default value for the parameter M when it is not included in the input.

3. A digital-signal-processor-implemented signal prediction system for predicting the future value of a signal from prior measurements of the signal, said system comprising means to measure the signal at a baseline time and at incrementally later times, said increments comprising a number of geometric sequences, and means to multiply solely said signal measurements and the multiplicative inverses of any of said signal measurements together to form a product, which is the prediction.

4. The system according to claim 3 which further comprises a Prediction Control (PC) module, a number of Geometric Sampling Unit (GSU) modules, and a Prediction Accumulation Multiplier (PAM) module.

5. The system according to claim 4 which further comprises the means to receive a plurality of input parameters, said parameters specifying:
    (a) a baseline measurement time $t_0$;
    (b) a sampling interval $\Delta s$, equal to the length of the time interval between the baseline time and the time when the final signal measurement of a prediction is made;
    (c) a prediction interval $\Delta p$ equal to the length of the time interval between the time of the last signal measurement and the time for which the prediction of the signal is made;
    (d) a time interval $\Delta T_{cycle}$, being the time interval between successive periodic signal predictions;
    (e) an integer N that determines the number of measurement increments within each of a number of geometric sequences,
    (f) a parameter $N_{cycle}$ determining the number of predictions to be made;
    (g) and optionally a positive integer M determining the number of geometric sequences of time increments beyond the baseline time at which the signal will be measured, which defaults to a predetermined value stored within the system when not received;
and to distribute to the GSUs and the PAM input parameters and quantities derived therefrom.

6. The system of claim 4 which further comprises the means to generate all $2^M-1$ non-empty subsets of the first M integers, including the subset containing all of them, M being an input parameter that is a positive integer or a default value that is a positive integer, and to distribute to each of $2^M-1$ GSUs a unique one of the non-empty subsets of the first M positive integers.

7. The system of claim 4 which further comprises the means for each GSU module to access and measure the signal at the baseline time, and to transmit the baseline signal measurement to the PAM; and to access and measure the signal at times incrementally subsequent to the baseline time, said time increments comprising one of said geometric sequences, whose time increments depend upon a unique one of said subsets of integers and other parameters collected by said system.

8. The system of claim 4 which further comprises the means for each GSU module to normalize a baseline-subsequent signal measurement by dividing it by the measured baseline value of the signal; and to form the inverse of said normalized measurement; and to raise either the normalized signal measurement or its inverse to a power, thereby forming a prediction factor.

9. The system of claim 4 which further comprises the means for each GSU module to transmit to the PAM module the baseline signal measurement or said prediction factor, accompanied by a data value that indicates whether the GSU is finished reporting its values for one prediction.

10. The system of claim 4 which further comprises the means for each GSU to determine whether said GSU is the unique GSU module that is to report its measurement of the baseline signal measurement to the PAM.

11. The system of claim 4 which further comprises the means for the PAM module to calculate the predicted signal value by forming the product of the baseline signal measurement and all of said prediction factors, as they are serially received from the GSUs; and to output the predicted signal value, along with the time for which it is the predicted signal value.

12. The signal prediction system of claim 3 which further comprises the means to operate iteratively, thereby producing a finite number of periodic signal predictions, or a continuing stream of periodic signal predictions.

* * * * *